Sept. 22, 1970 A. CHRISTEN 3,529,880

STORAGE MODULE

Filed Dec. 18, 1968 10 Sheets-Sheet 1

INVENTOR.
ANDREAS CHRISTEN
BY Lester W. Clark
ATTORNEY

Sept. 22, 1970 A. CHRISTEN 3,529,880

STORAGE MODULE

Filed Dec. 18, 1968 10 Sheets-Sheet 2

Sept. 22, 1970 A. CHRISTEN 3,529,880

STORAGE MODULE

Filed Dec. 18, 1968 10 Sheets-Sheet 4

United States Patent Office
3,529,880
Patented Sept. 22, 1970

3,529,880

STORAGE MODULE

Andreas Christen, Zurich, Switzerland, assignor to Art Metal-Knoll Corporation, New York, N.Y., a corporation of Delaware Filed Dec. 18, 1968, Ser. No. 784,676
Int. Cl. A47b *17/06, 53/00, 95/02*
U.S. Cl. 312—194 35 Claims

ABSTRACT OF THE DISCLOSURE

A storage module that may be easily supported in any of a number of locations so as to be capable of being incorporated into varied environments. The module includes a frame and an enclosure surrounding the frame which is carried by the frame. The frame also carries support members within the enclosure for supporting one or more storage elements. A band outside the enclosure encircles the enclosure and secures the enclosure to the frame. The frame may be secured to any number of different types of support structures so that the storage module may form part of a desk, may be mounted on a wall, or may be incorporated in conventional filing drawer systems, for example.

BACKGROUND OF THE INVENTION

This invention relates to storage systems, and is particularly directed to providing a storage module that can find use in any of a number of varied environments. The module is adapted to be simply supported, essentially by being hung, so that it may be carried directly on a wall, on a deck pedestal, or on a pedestal for carrying a plurality of such modules, to name a few examples.

The present invention is thus directed to providing a storage module that is extremely adaptable to different uses. Conventional filing drawer systems, for example, do not employ modular assemblies, to the extent that the individual file drawers can only find use in a certain type of support structure, thus severely limiting their use. The present invention provides adaptability by employing a module which is essentially a "hung" structure. The module is hung from any of a number of different types of supports, e.g., a desk pedestal, a wall bracket, and the like. Hence the module can find application in one environment as part of the desk, for example. With no change, the module can be removed from the desk and be made a part of an overall typical file system, for example, or may be hung from a wall, or may be stored on a shelf. The module is thus a self-contained enclosure that may be easily moved as a unit from one environment to another.

Accordingly, an object of the present invention is to provide a storage module.

Another object of the invention is to provide a storage module capable of finding use without change in any of a number of different environments.

BRIEF DESCRIPTION OF THE INVENTION

The present invention carries out these objects by providing a storage module involving essentially a frame and an enclosure surrounding the frame which is supported by the frame. The frame carries support arms to support one or more storage elements such as file drawers, movable shelves, and the like within the enclosure. A band secures the enclosure to the frame, and the frame is adapted to be supported, i.e., "hung," from any of a number of different support structures. Thus, the storage module of the present invention involves a "hung" structure which is completely self-contained.

The invention will be more completely understood by a consideration of specific embodiments thereof described below and shown in the accompanying drawings.

DETAILED DESCRIPTION

Figure 1:
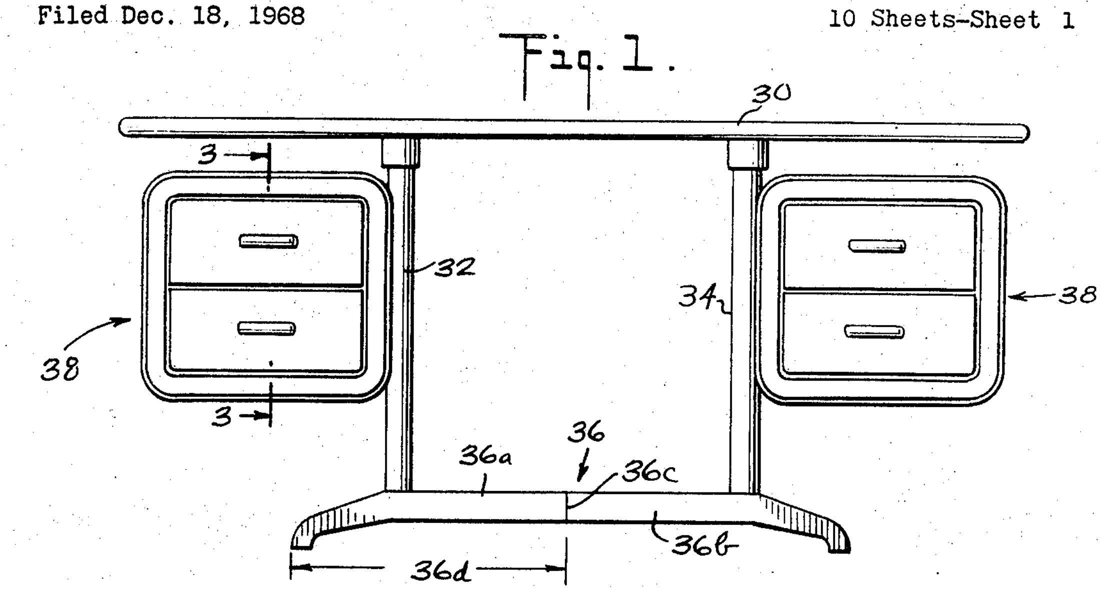
FIG. 1 is a front view of a desk incorporating storage modules in accordance with the invention.
Figure 2:
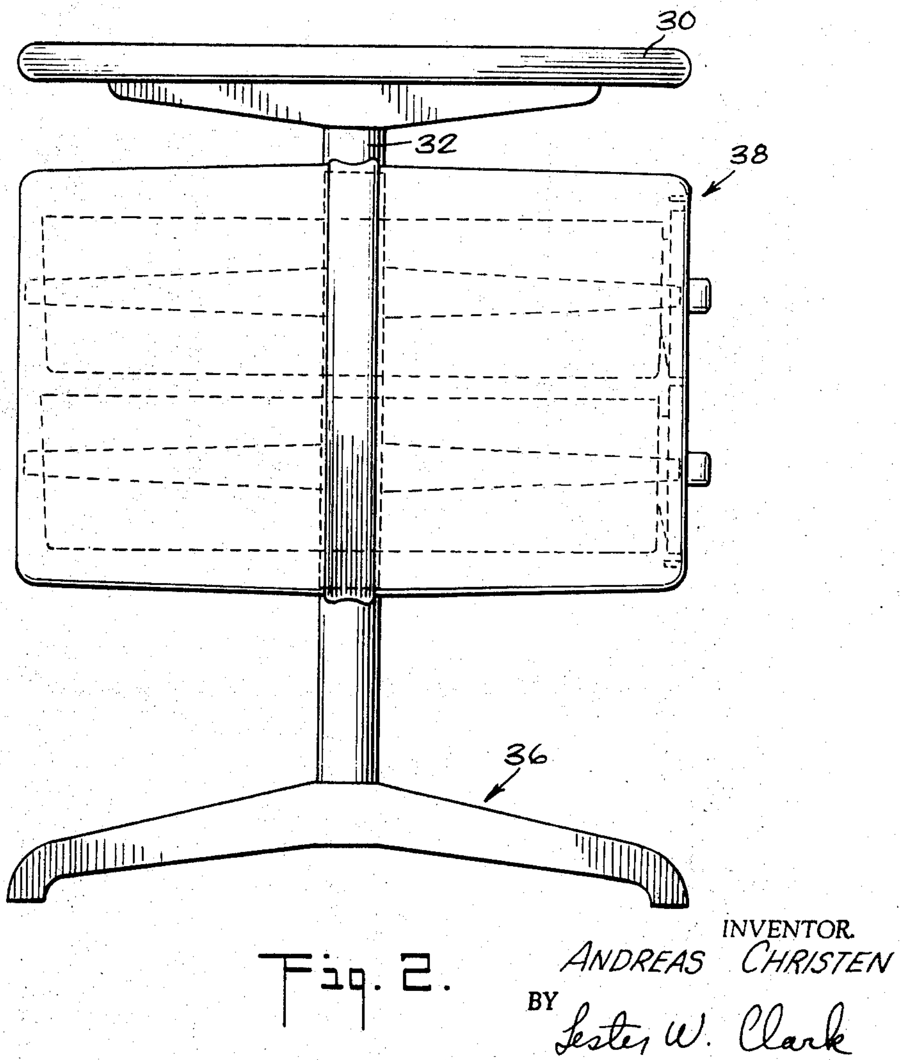
FIG. 2 is an end view of the desk of FIG. 1.

Referring to FIG. 1, a desk incorporating two storage modules 38 in accordance with the invention is shown. The desk involves a typical top 30 supported by tubular pedestals 32 and 34 carried by a conventional footing structure 36. The footing structure is shown in FIG. 1 as formed from sections *36a* and *36b* joined together at *36c*. The joint *36c* is shown in FIG. 1 to demonstrate that the footing structure may be formed from two different identical pieces which abut as shown, and which are secured together such as by welding (when the footing structure is metal). The joint is thereafter ground and painted so that in the completed article of furniture the joint is not visible. Typically the footing structure 36 is a cast piece. The advantage of forming two identical castings which are later joined together is that different sizes of footing structures may be easily made. That is, a casting tool is employed into which the metal of the footing structure is poured, and an insert may be positioned in the end of the tool so that the length of the footing structure, i.e., the length designated 36*d* in FIG. 1, may be varied as desired.

A storage module 38 is hung from each of the pedestals 32 and 34 to complete the desk structure. One type of module 38 is shown in FIGS. 2 to 5, and in this embodiment includes two individual file drawers. The number of drawers in a module is arbitrary and may vary from one to any convenient number. If file drawers are not desired, movable shelves, for example, may be substituted as will be explained in more detail below.

As employed herein, the term "storage module" designates a filing or storage component that is adapted to house one or more storage elements, i.e., storage elements such as drawers, trays, shelves, writing tablets, and the like.

Figure 3:
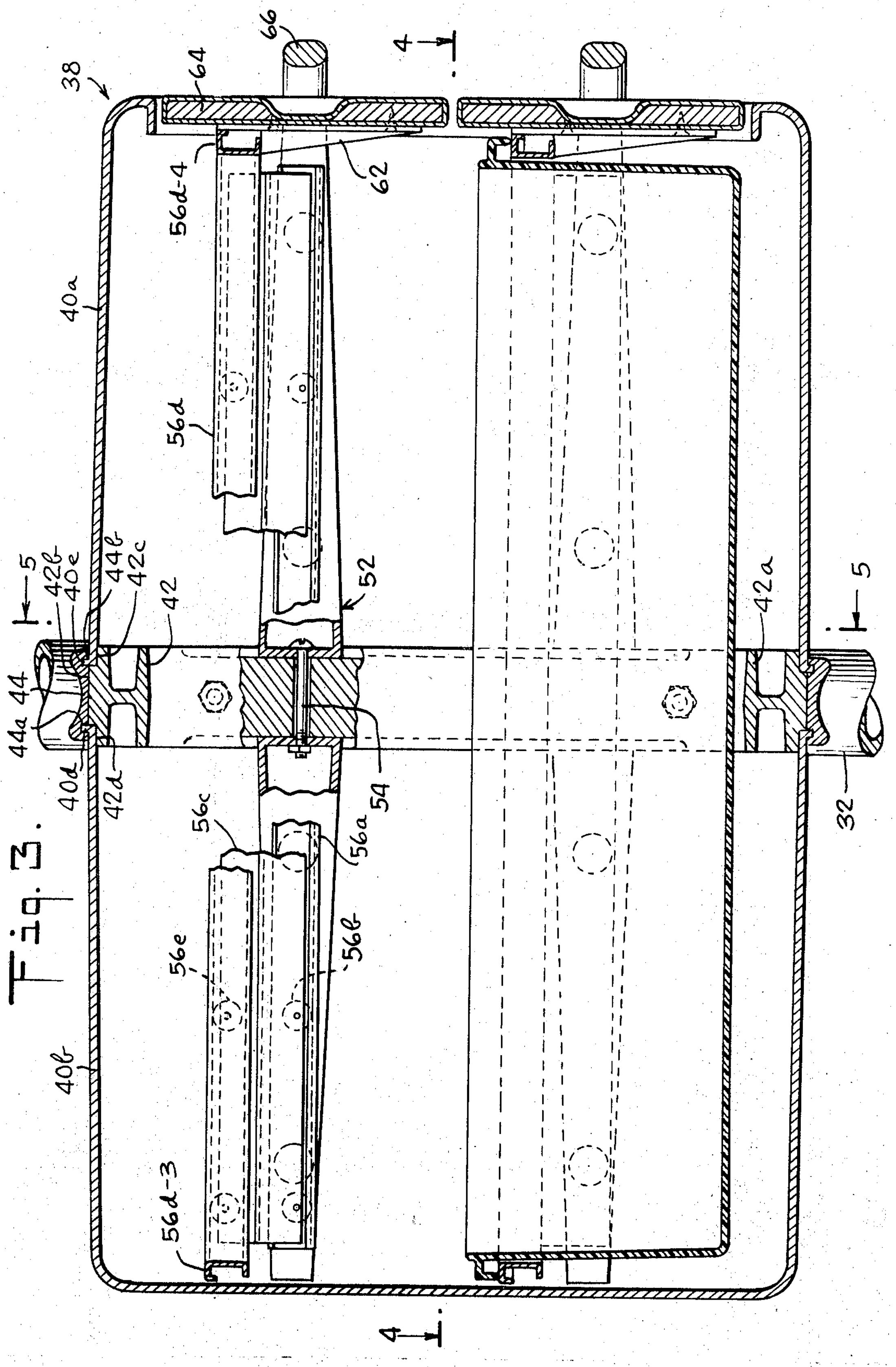
FIG. 3 is a sectional view of one of the storage modules of FIG. 1, taken along the section line 3—3 of FIG. 1.
Figure 4:
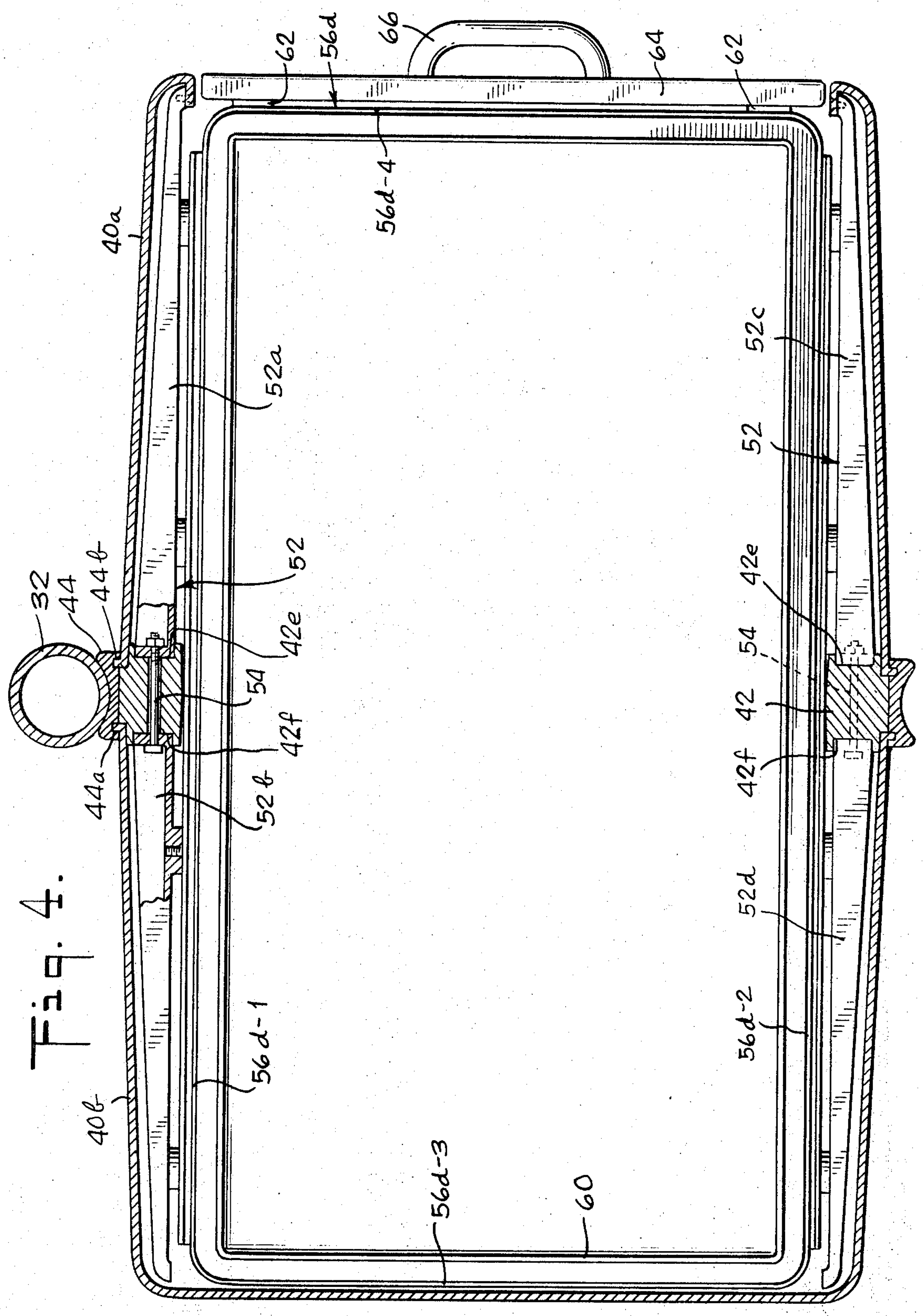
FIGS. 4 and 5 are sectional views of the storage module of FIG. 3, taken along the section lines 4—4 and 5—5 of FIG. 3.
Figures 5, 6, 7:
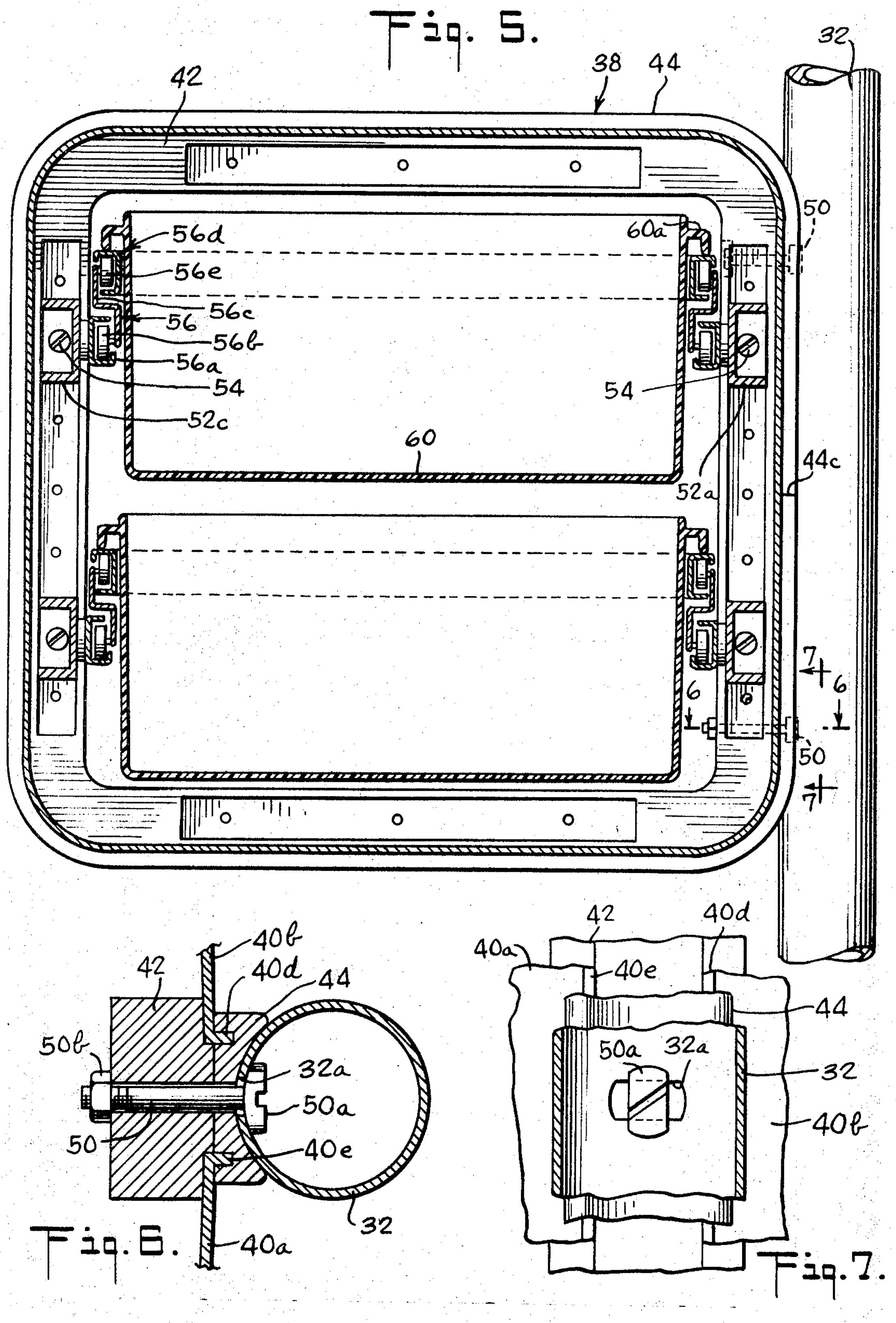
FIGS. 6 and 7 are sectional views of part of the module shown in FIG. 5, taken along the section lines 6—6 and 7—7 of FIG. 5.

Referring to FIGS. 3 and 4, the module 38 comprises an enclosure formed from an open front section 40*a* and a closed rear section 40*b*. The enclosure sections are carried by a frame 42 typically of die cast metal which extends about a girth of the enclosure in the mid-region of the enclosure. The frame 42 may be grooved as at 42*a* (H-shaped in section) to save frame material and speed the casting cycle. The frame includes an outer surface 42*b* which is notched along the two outer edges thereof as at 42*c* and 42*d* to receive the edges of the enclosure sections 40*a* and 40*b*. These edges include projections 40*d* and 40*e* which aid in the securing of the enclosure to the frame. Specifically a band 44, typically of extruded metal, is included as part of the module and encircles the enclosure outside thereof opposite the frame 42. The band 44 is slotted as at 44*a* and 44*b* to receive the projections 40*d* and 40*e*. The band 44 may be of any suitable bendable material which is positioned about the girth of the enclosure opposite the frame 42 to secure the enclosure sections to the frame. As shown in FIG. 5, the ends of the band 44 may abut at 44*c* against the pedestal 32 so that the abutting of the ends of the band is effectively concealed from view.

The band 44 is maintained in place securing the enclosure sections 40*a* and 40*b* to the frame 42 by virtue of the supporting of the band and frame by the pedestal 32. Referring particularly to FIGS. 5 to 7, it will be seen that the storage module is essentially hung from the pedestal. In particular the pedestal 32 constitutes a tubular support member which is slotted as at 32*a* so that bolts 50 having heads 50*a* shaped similarly to the slots 32*a* may be positioned with the heads inside the tubular support member 32. In FIG. 5 two of such bolts 50 are employed; the number is not important except to ensure a sturdy, well supported structure. Each bolt 50 passes through a hole in the band 44 and frame 42, as shown in FIGS. 6 and 7. A nut 50*b* inside the enclosure secures each bolt in place.

The module may be hung by loosely positioning the bolts 50 through the holes in the frame 42 and band 44. The heads 50*a* of the bolts are aligned with the slots 32*a* in the tubular support 32 so that the heads can pass through the slots into the interior of the tubular support. The bolts are then turned so that each bolt head assumes an orientation as shown in FIG. 7. At this time the nuts 50*b* are tightened, securing the frame, enclosure sections and band together as well as to the tubular support.

Alternatively the bolts 50 may be first positioned in the tubular support 32 and spring held in place (no springs are shown in any of the figures). The module is then hung on the bolts by positioning the bolts through the holes in the frame 42 and band 44, following which the nuts 50*b* are screwed on the bolts and tightened.

The storage module 38 includes a support arm structure for supporting storage elements such as file drawers and the like. This structure is shown in FIGS. 3 and 4 and comprises a support arm 52 which is bolted to the frame 42 by means of a bolt 54. For each storage element to be supported there are typically four of such support arms 52, designated 52*a*, 52*b*, 52*c* and 52*d* in FIG. 4. The support arms 52*a* and 52*b* are mounted on one side of the enclosure while the support arms 52*c* and 52*d* are mounted on the other side of the enclosure. The support arms 52*a* and 52*b* extend in opposite directions and are mounted on opposed surfaces 42*e* and 42*f* of the frame 42; likewise the support arms 52*c* and 52*d* extend in opposite directions and are mounted on the opposed surfaces 42*e* and 42*f* of the frame. To this end the bolts 54 passing through the frame secure the opposed support arms to the frame in these positions.

The support arms 52 support track structure for storage elements. One possible form of track structure, designated 56, is shown in FIG. 5 and is conventional. The track structure supported by the arms 52*c* and 52*d* on one side of the enclosure will be described. The track structure 56 typically involves a fixed track 56*a* which is secured to the support arms 52*c* and 52*d*. Rollers 56*b* are guided within the track 56*a* and are affixed to an intermediate movable track 56*c*. A third track 56*d* is included which receives rollers 56*e* that are also affixed to the intermediate track 56*c*. The track 56*d* extends in the form of a closed loop completely about the enclosure, as shown in FIG. 4. That is, the track 56*d* includes two sections 56*d*–1 and 56*d*–2 on both sides of the enclosure adjacent the track support arms 52. It also includes two sections 56*d*–3 and 56*d*–4 at the ends of the enclosure. The sections 56*d*–1 and 56*d*–2 carry the rollers 56*e* therein; the sections 56*d*–3 and 56*d*–4 are simply for the purpose of extending the track 360° throughout the enclosure for the purpose of supporting a file drawer 60, for example.

As shown in FIG. 5, the file drawer 60 includes a downwardly projecting rim 60*a* about the upper edge thereof which rides on the track 56*d*. The file drawer 60 is thus maintained in place by fitting inside the track structure and is supported by the track structure. As shown in FIG. 3, the track section 56*d*–4 has a bracket 62 affixed thereto which is in turn secured to a drawer front 64. The drawer front includes the usual handle 66. Handleless drawer fronts may also be provided, as explained below. Thus the file drawer 60 is moved into and out of the enclosure through the open end of enclosure section 40*a* by sliding action provided by the track structure 56. This track structure may include the usual conventional arrangements for disengaging the intermediate track 56*c* from one of the tracks 56*a* and 56*d* so that the file drawer 60 along with part of the track structure may be removed completely from the enclosure. These conventional details of the track structure have not been shown.

Figure 8:
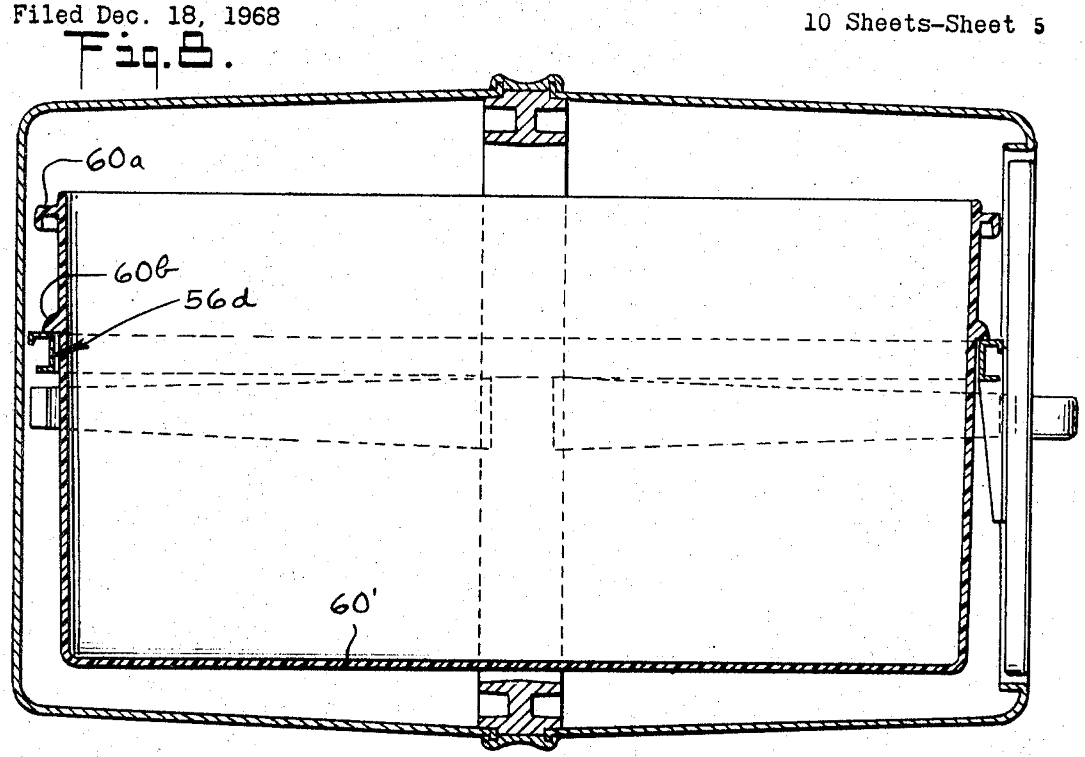
FIG. 8 is a sectional view of a storage module similar to the sectional view of FIG. 3, showing a file drawer different from the one shown in FIG. 3.

FIG. 8 shows an alternative file drawer. File drawer 60' includes the downwardly projecting rim 60*a* about the top edge thereof which, in this case, provides rigidity to the file drawer. A projection 60*b* is also included about the outside of the file drawer beneath the rim 60*a*, and the projection 60*b* is adapted to ride on the track member 56*d*. The advantage of this file drawer structure is that the rim 60*a* may serve as an exposed handle by which the file drawer may be lifted upwardly and completely out of and away from the track 56*d*. The amount by which a drawer must be lifted to disengage it from the track is less with the type of drawer structure shown in FIG. 8 than it is with the type of drawer structure shown in FIG. 5 in which the top of the drawer sits on the track.

Figure 9:
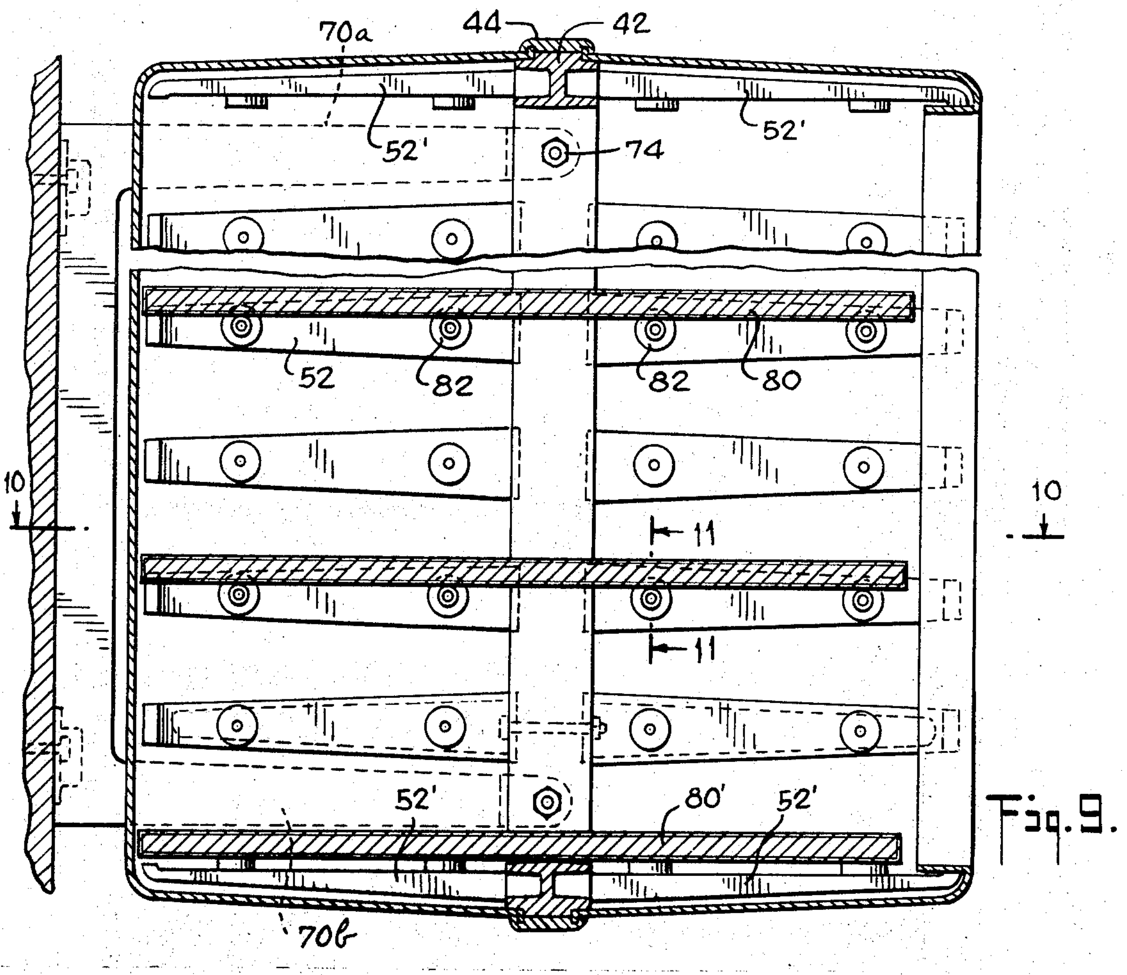
FIG. 9 is a sectional view of another storage module, showing the details of a wall bracket support for the module, as well as movable shelves.
Figure 10:
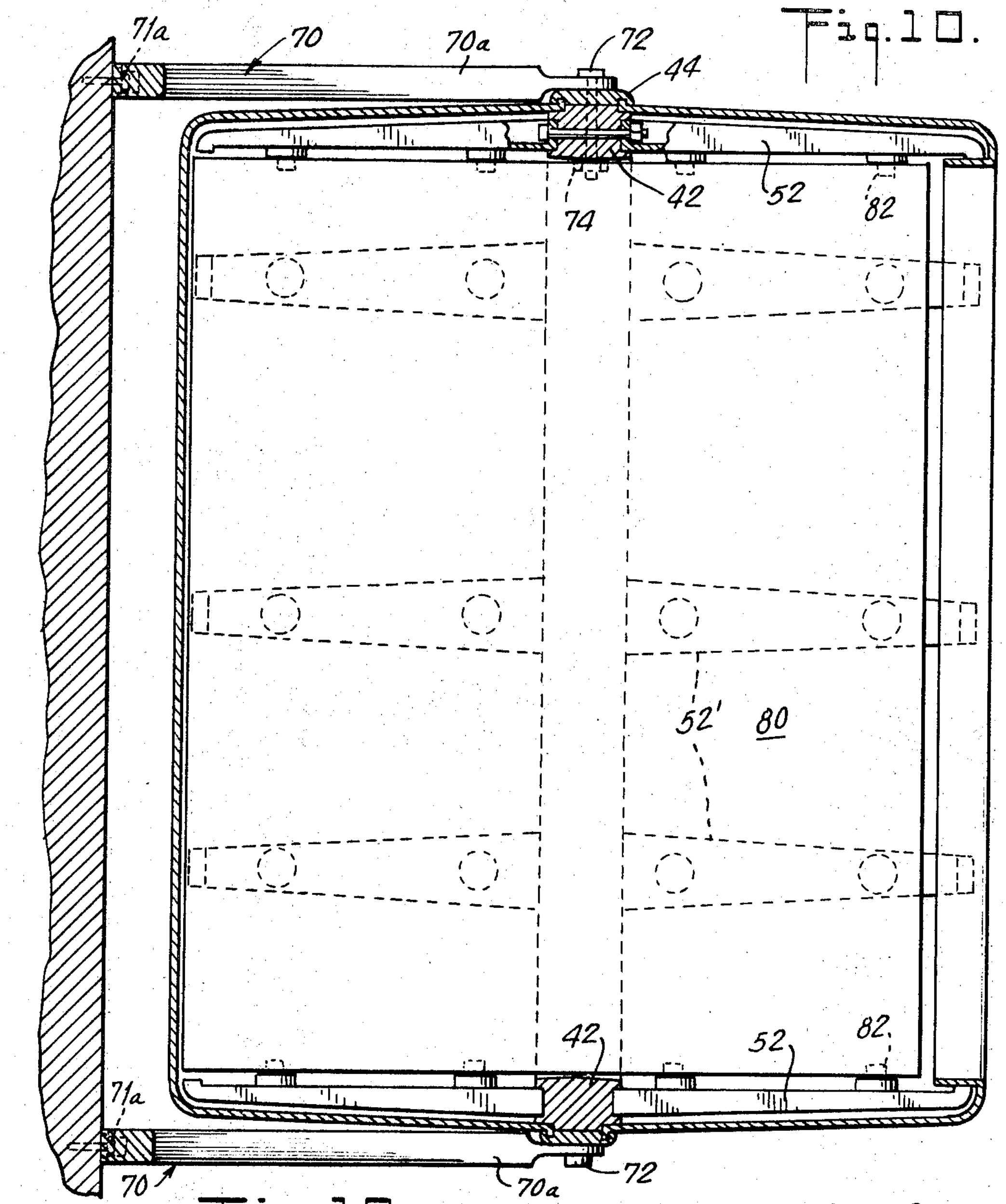
FIGS. 10 and 11 are sectional views of the storage module of FIG. 9, taken along the section lines 10—10 and 11—11 of FIG. 9.
Figure 12:
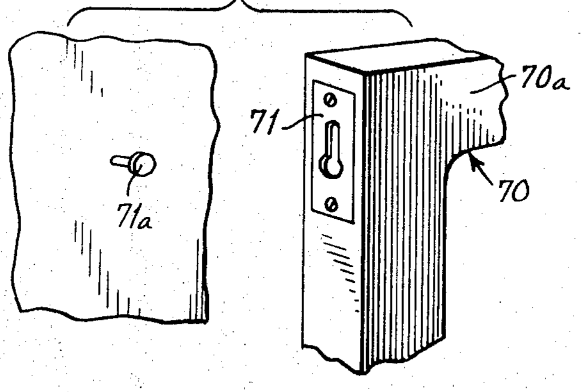
FIG. 12 is a perspective view of part of the wall bracket supporting structure of FIGS. 9 and 10.

FIGS. 9 and 10 show the details of a bracket structure for hanging one of the storage modules on a wall, for example. These figures also show how the modules may be used to house movable shelves and the like. Referring to FIGS. 9 and 10 together, a pair of identical brackets 70 are employed on either side of the storage module. Each bracket includes an upper outwardly extending arm 70*a* and a lower outwardly extending arm 70*b*. The brackets are hung on a wall or other supporting surface as shown in FIG. 12. In particular, the bracket 70 includes slotted plates 71 which engage corresponding projecting members 71*a* supported by the wall or other support surface, so that the brackets are hung from that surface in conventional fashion.

The bracket arms 70*a* and 70*b* are secured to the frame 42 by bolts 72 which pass through the ends of the arms 70*a* and 70*b*, through the band 44 and frame 42 and are secured in place by nuts 74 threaded on the ends of the bolts. The holes through the band 44 and frame 42 may be the same holes used to accommodate the bolts 50 securing the storage module shown in FIG. 5 to the tubular support 32. Thus it is seen that the storage module of the present invention may be moved from a tubular support, for example, and hung from wall supports, for example, without any change in the module construction. This is an indication of the flexibility of the storage module of the present invention.

Figure 11:
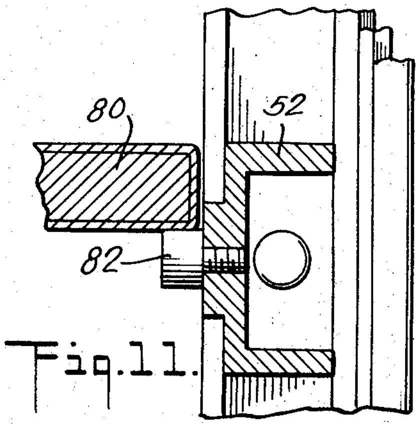

FIG. 9 shows a plurality of shelves 80 constituting the storage elements within the storage module. In this case each shelf 80 rides on rollers 82 supported by the support arms 52 (see also FIG. 11). In this case support arms 52′ may be included at the top and bottom of the enclosure and supported by the frame 42. The support arms 52′ at the bottom of the enclosure may be used for supporting the lowermost one of the shelves designated 80′ in FIG. 9.

Figure 13:
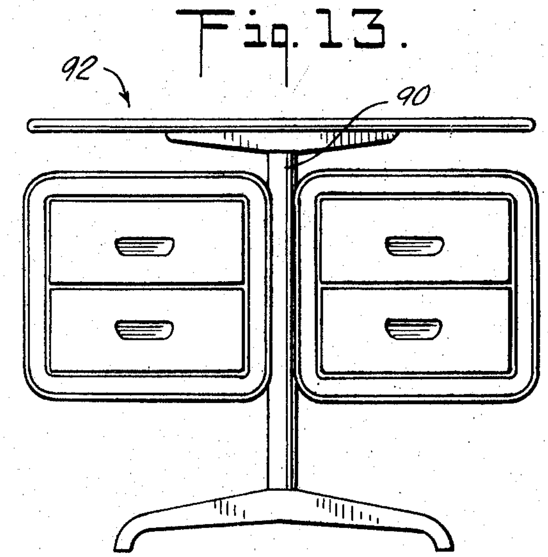
FIGS. 13, 14 and 15 are views of different storage systems in accordance with the invention.
Figure 15:
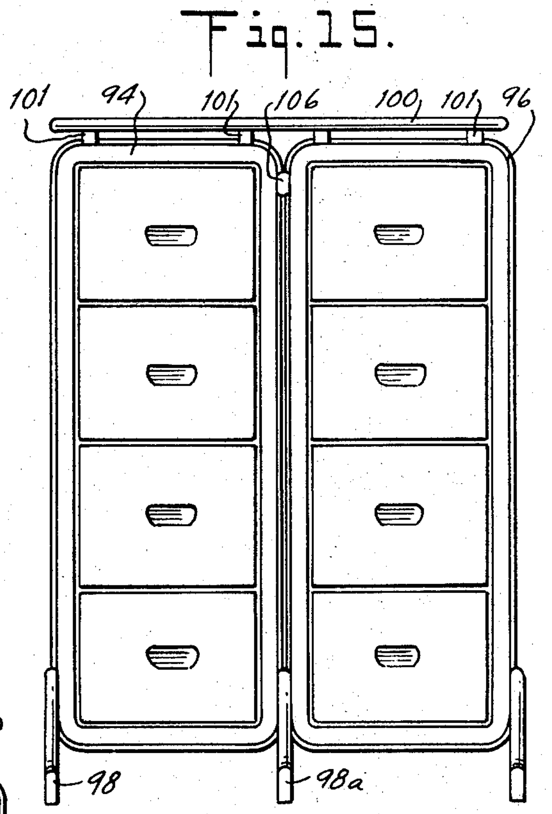
Figure 14:
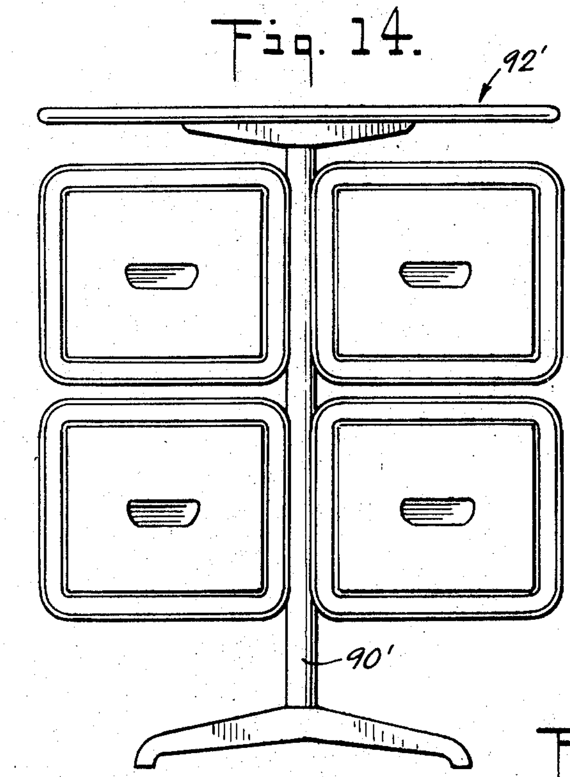
Figure 16:
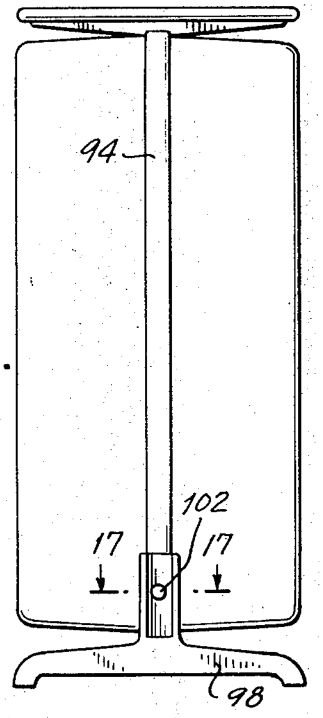
FIG. 16 is a side view of the storage system shown in FIG. 15.

FIGS. 13 to 22 show some typical uses for the stoarge module of the present invention. In FIG. 13 two storage modules are shown mounted on opposite sides of a tubular support 90 forming part of the pedestal of a table 92. In FIG. 13 each module is a two-drawer unit. FIG. 14 shows a similar table 92′ in which four modules are mounted opposite each other on opposite sides of tubular support member 90′. In this instance one module is hung over another on each side of the tubular support. In this case the modules are shown as being single drawer units. FIGS. 15 and 16 show another arrangement, in this case more of a typical filing drawer arrangement. Eight storage modules are used, four of which are supported by a support structure 94 and the other four of which are supported by a support structure 96. Support structures 94 and 96 terminate in conventional pedestals 98. A top structure 100 may be included, if desired, mounted upon spiders 101.

Figure 17:
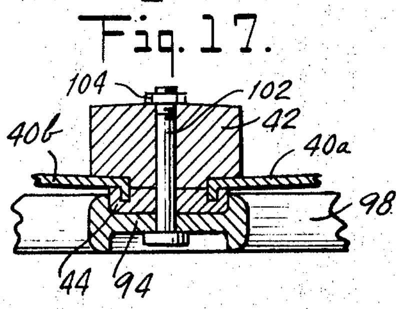
FIG. 17 is a sectional view of part of the support structure shown in FIG. 16, taken about the section line 17—17 of FIG. 16.

FIG. 17 shows the details of mounting the storage modules to the support member 94. The support member 94 is typically H-shaped in section so as to engage the band 44. A bolt 102 extends through the support 94, band 44 and frame 42 of the module and is held in place by nut 104. Again, this method of mounting is the same as mounting the module shown in FIG. 5 to the tubular support 32, for example, and the same holes through the band 44 and frame 42 may be employed for this purpose.

Figure 18:
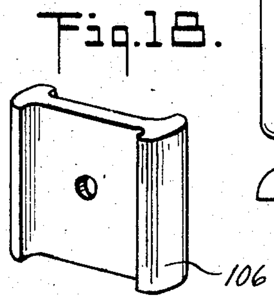
FIG. 18 is a perspective view of an insert forming part of the support structure of FIG. 15.

In FIG. 15 it will be noted that the middle one of the pedestals 98*a* is positioned between the supports 94 and 96. An H-shaped spacer 106 shown in detail in FIG. 18 is employed to space apart the supports 94 and 96 at the tops thereof as does the pedestal 98*a* at the bottoms thereof.

Figure 19:
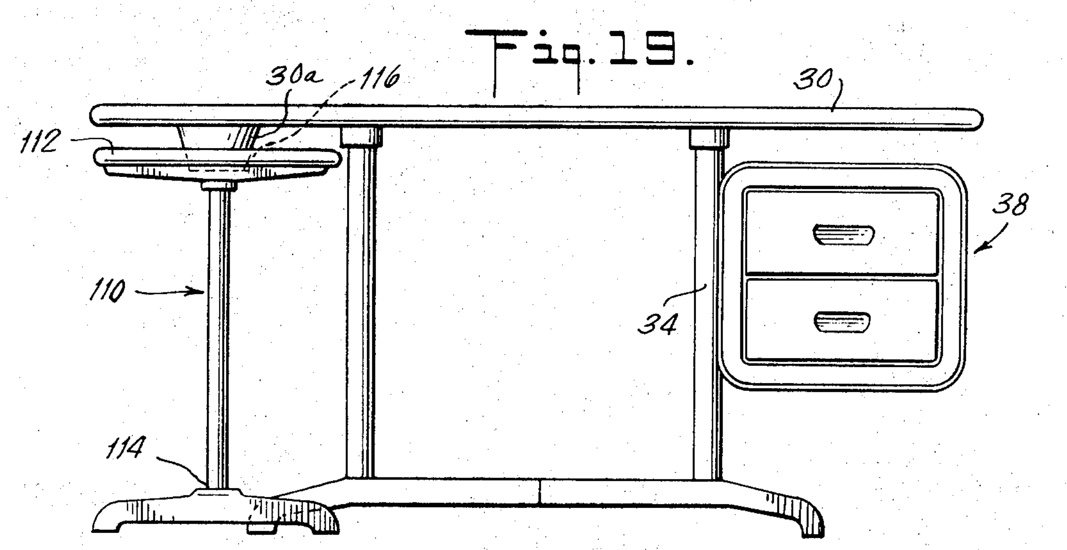
FIG. 19 is a front view of a desk, including a typing extension pivotally attached thereto, in accordance with the invention.
Figures 20, 21, 22:
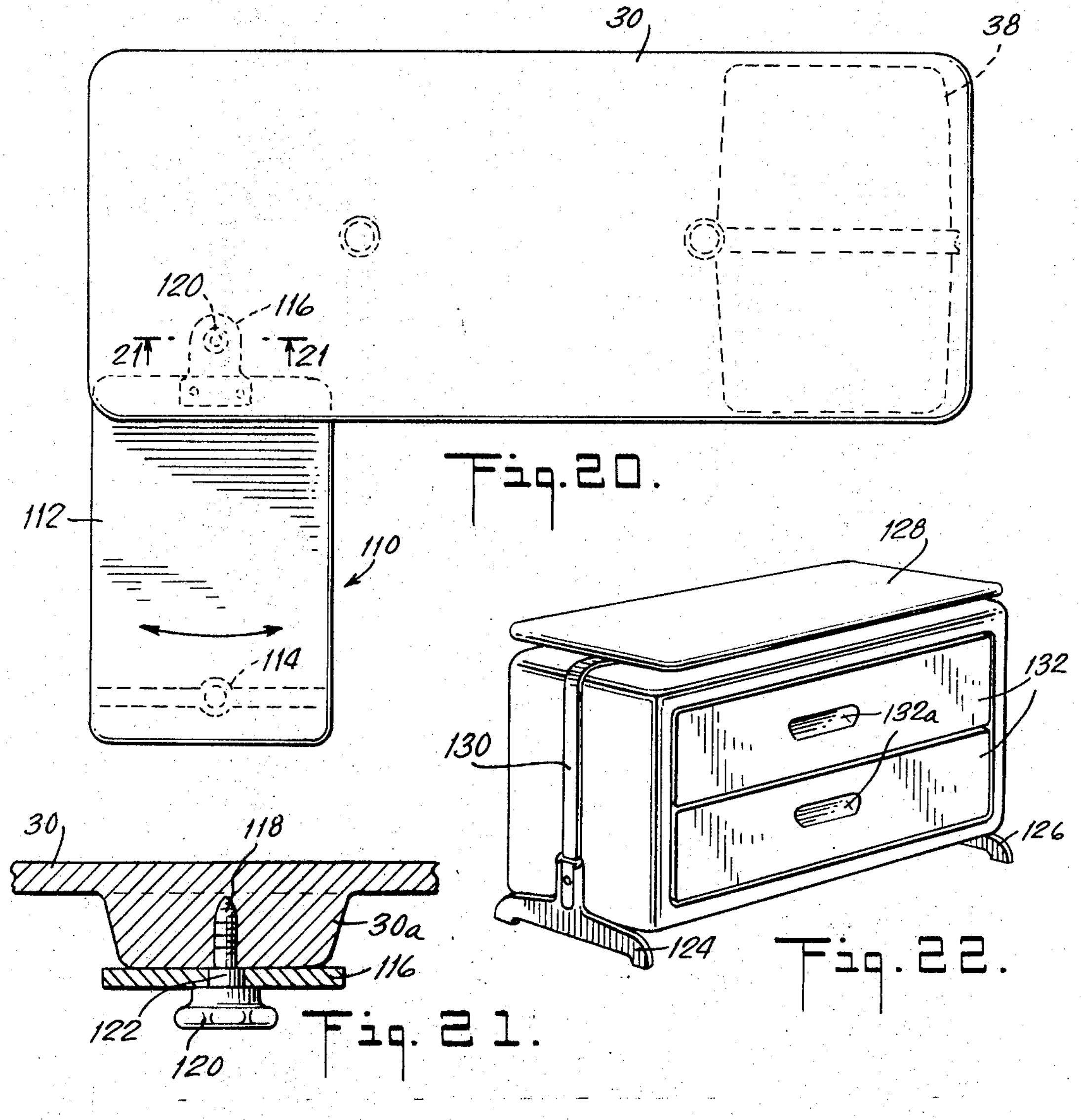
FIG. 20 is a plan view of the desk of FIG. 19.
FIG. 21 is a sectional view of a part of the desk of FIG. 20, taken along the section line 21—21 in FIG. 20 and showing the details of a pivotal desk extension support structure.
FIG. 22 is a perspective view of another storage module arrangement.

FIG. 19 shows an arrangement similar to FIG 1 in which a storage module 38 is mounted on tubular support 34 forming part of a desk. In this case only one filing drawer module is included on one side of the desk beneath the desk top 30. A typing extension 110 may be positioned at the other side of the desk and pivotally secured to the desk top as shown in FIGS. 20 and 21. In particular, the typing extension 110 may include a typewriter support surface 112, with a pedestal 114 at one end of the support surface. A plate 116 is secured to the underside of the support surface 112 at the other end of this support surface and is positioned beneath a downwardly extending portion 30*a* of the desk top. A stud 118 carrying a handle 120 is threaded into the desk top portion 30*a*. The handle 120 secures the support surface 112 beneath the desk top. A bearing 122 permits the typing extension 110 to be pivoted to any position desired when the handle 120 is loosened. The handle is then tightened to maintain the typing extension in position.

FIG. 22 shows a single storage module mounted on a pair of legs 124 and 126. The module constitutes a two-drawer storage unit that includes a top 128 thereon. The legs 124 and 126 are mounted to the frame within the module and to band 130 by means the same as shown in FIGS. 17 and 18. The top 128 is secured to the band and frame by spiders (not shown in FIG. 22 but the same as spiders 101 in FIG. 15) beneath the top which support and are secured to the top and in turn are secured to the frame and band 130. The drawer fronts 132 of the storage module may include recessed handles 132*a* of the type shown in FIGS. 23 to 25 about to be described.

Figures 23, 24:
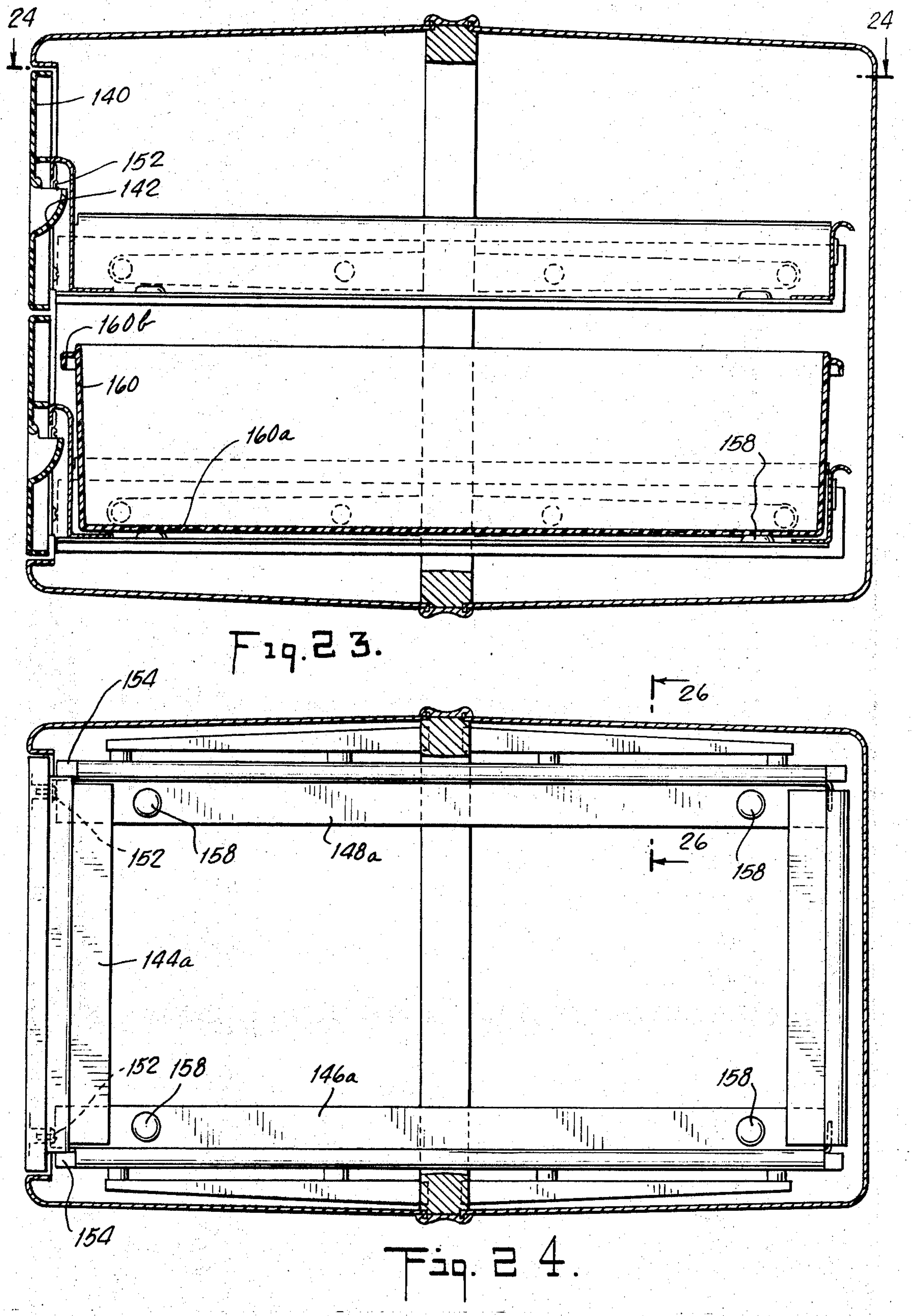
FIG. 23 is a side sectional view of a storage module including a drawer front and frame in accordance with the invention.
FIG. 24 is a plan sectional view of the storage module shown in FIG. 23, taken along the section line 24—24 in FIG. 23.

FIGS. 23 and 24 are sectional views of a storage module in accordance with the invention involving a modified drawer front that includes recessed handles as well as a storage element in the form of a frame.

Figures 25, 26, 27:
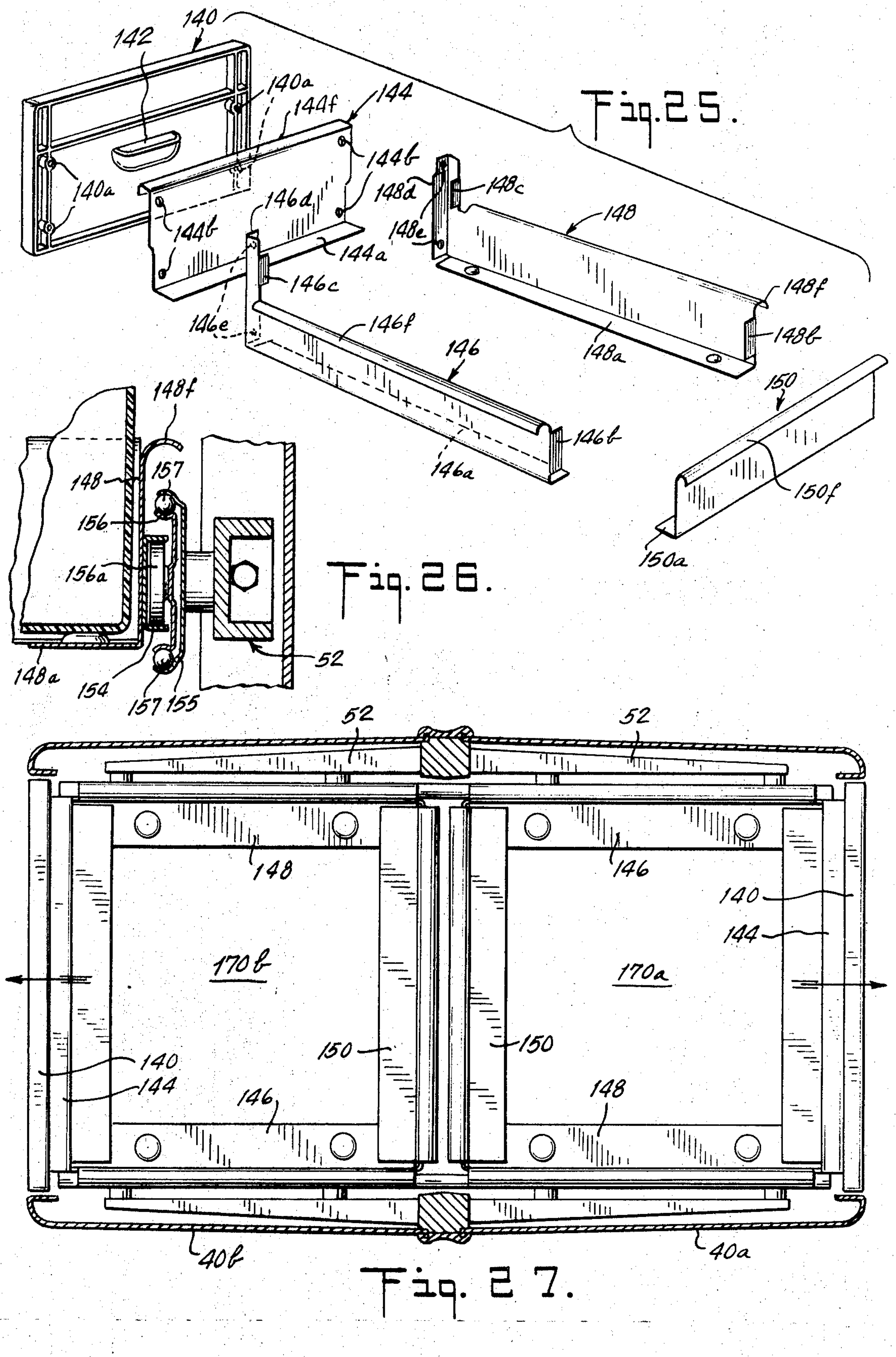
FIG. 25 is an exploded view of the drawer front and frame shown in FIGS. 23 and 24.
FIG. 26 is a sectional view of part of the module of FIG. 24, taken along the section line 26—26 in FIG. 24 and showing the details of a representative track arrangement.
FIG. 27 is a plan sectional view of another storage module in accordance with the invention, open at both ends to accommodate two storage elements, each accessible from a different end of the module.

FIG. 25 shows the drawer front and frame in an exploded view. Drawer front 140 may be made of molded plastic, including a recessed handle 142 therein. The drawer frame, which may be of sheet metal, includes a front cover piece 144, two side pieces 146 and 148, and a back piece 150. The front cover piece includes a bottom flange 144*a* and holes 144*b*, drilled or punched therein. The side piece 146 includes a bottom flange 146*a*, a rear end flange 146*b* and a pair of front end flanges 146*c* and 146*d*. The side piece 148 is similarly formed with a bottom flange 148*a*, rear end flange 148*b*, and front end flanges 148*c* and 148*d*. Side piece 146 includes holes 146*e* therein, and side piece 148 includes similar holes 148*e*. Finally back piece 150 includes a bottom flange 150*a*. The front cover, side, and back pieces all respectively include upper flanges 144*f*, 146*f*, 148*f* and 150*f*.

The drawer frame is typically assembled by spot welding together the front cover, side, and back pieces. In this connection, FIGS. 23 and 24 show the frame in assembled condition in which the bottom flange 144*a* of the front cover piece is positioned over and spot welded to the bottom flanges 146*a* and 148*a* of the side pieces. The main surface of the front cover piece is positioned against and spot welded to the front end flanges 146*c* and 148*c* of the side cover pieces. The bottom flange 150*a* of the back piece is positioned over and spot welded to the bottom flanges 146*a* and 148*a* of the side pieces. The main surface of the back piece is positioned against and spot welded to the rear end flanges 146*b* and 148*b* of the side pieces. The upper flange 144*f* of the front cover piece is positioned against the drawer front as shown in FIGS. 23 and 24, and screws 152 extending through the holes 146*e* and 148*e* in the flanges 146*d* and 148*d* secure the plastic drawer front to the drawer frame. In this regard the screws 152 are threaded into holes 140*a* in the plastic drawer front( see FIG. 25), and the holes 144*b* in the front cover piece 144 permit access to the screws.

The side pieces 146 and 148 of the drawer frame are adapted to carry drawer slides 154 thereon, as shown in FIG. 26 for side piece 148. The drawer slides form part of a conventional track mechanism to provide for the sliding of the drawer in and out of the storage module. A fixed track 155 is secured to the support 52 (support arms 52*a* and 52*b*) by screws (not shown) threaded into the support arm structure. An intermediate track 156 carrying rollers 156*a* thereon cooperates with the fixed track 155 so that the two may be moved relatively with respect to each other (by virtue of ball bearings 157). The rollers 156*a* on the intermediate track roll within the fixed track 154 that is affixed to the side piece 148, typically by being spot welded to the side piece.

As shown in FIGS. 23 and 24, the bottom flanges 146a and 148a of the drawer frame side pieces carry rubber bumpers 158. These bumpers serve to support a storage element such as a plastic box 160, the bottom 160a of which is seated upon the plastic feet. The box 160 is maintained in place by the drawer frame and is easily removed from the frame or positioned within the frame. The box may be grasped by use of rim 160b at the top of the box. In this regard, the upper flanges 144f, 146f, 148f and 150f of the drawer frame, which are curved outwardly from the frame and downwardly, facilitate the positioning of a box within the frame.

Alternatively a box such as 160 need not be employed, and a single plate of material, such as plastic or wood, may be positioned against the bottom flanges 144a, 146a, 148a and 150a of the drawer frame. The drawer frame with the bottom plate itself constitutes a box for the storage of articles, such as pencils, erasers, ink bottles and the like. It will be noted thus that the drawer frame shown in FIG. 25 is a versatile component of the module, easily lending itself to use as a storage element. The side front, and back pieces extend upwardly sufficiently to maintain articles in place. If a deeper storage element is desired, a box such as the box 160 can be carried by the frame.

FIG. 27 is a sectional plan view of a storage module similar to that shown in FIG. 24, except that both ends of the module are open and the module is adapted to include two file drawers 170a and 170b therein. Each of the drawers involves a door frame and front as described in connection with FIG. 25. The file drawers may be moved out of the enclosure in opposite directions as shown by the arrows in FIG. 26.

SUMMARY

A unique storage module has been described lending itself to use in many varied environments. As noted, the structure is adapted to be "hung," and for this purpose includes a frame which also provides support for storage elements within the module. Different types of storage elements, such as trays, shelves and the like, may be utilized. The construction permits the simple interchanging of storage elements so that, for example, file drawers may be easily removed from a module and stored in another location if desired. The key concept of the invention, therefore, is adaptability to different environments, both of the module and the storage elements.

What is claimed is:

1. A storage module comprising a frame, an enclosure supported by and enclosing the frame, a band outside the enclosure for securing the enclosure to the frame, and a support member carried by the frame within the enclosure for supporting a storage element.

2. A storage module as defined in claim 1, wherein the frame extends about the girth of the enclosure.

3. A storage module as defined in claim 2, wherein the band extends about the girth of the enclosure opposite the frame.

4. A storage module as defined in claim 1, wherein the support member comprises at least one support arm projecting from a surface of the frame.

5. A storage module as defined in claim 1, wherein the support member comprises a pair of support arms projecting in opposite directions from two opposed surfaces of the frame.

6. A storage module as defined in claim 5, wherein there are a pair of such support arms on one side of the enclosure and another pair on another side of the enclosure.

7. A storage module as defined in claim 1, wherein the support member supports a track assembly adapted to movably support a storage element.

8. A storage module as defined in claim 7, including a storage element comprising a drawer frame.

9. A storage module as defined in claim 8, wherein the drawer frame is four-sided and has bottom flanges for supporting a plate or box within the frame.

10. A storage module as defined in claim 7, including a storage element comprising a drawer.

11. A storage module as defined in claim 10, wherein the drawer includes a rim extending outwardly therefrom adjacent the upper edge thereof.

12. A storage module as defined in claim 11, wherein the drawer is supported at its bottom, the rim serving as a handle by which the drawer may be engaged to remove it from the module.

13. A storage module as defined in claim 1, wherein the enclosure is open at one end thereof.

14. A storage module as defined in claim 13, including a storage element movably supported by the support member for movement through the open enclosure end.

15. A storage module as defined in claim 1, wherein the enclosure is open at two opposed ends.

16. A storage module as defined in claim 15, including two storage elements movably supported by the support member for movement of each through an individual one of the opposed open enclosure ends.

17. A storage module as defined in claim 1, and a support structure for supporting the module.

18. Apparatus as defined in claim 17, wherein the support structure is tubular, the frame and band and tubular support structure including aligned holes therein, and a bolt passing through the aligned holes for securing the frame and band to the tubular support structure.

19. Apparatus as defined in claim 18, wherein the hole in the tubular support structure is slotted, and wherein the bolt includes a head shaped the same as the slot to permit the bolt head to pass through the slot in one orientation and to be positioned inside the tubular support structure, the bolt head being retained within the tubular support structure when the head is reoriented approximately 90° preventing it from passing through the slot.

20. Apparatus as defined in claim 17, wherein the support structure comprises a tubular member, and means for securing the frame to the tubular member.

21. Apparatus as defined in claim 17, wherein the support structure includes a bracket adapted to be supported by a surface, and means for securing said bracket to said frame.

22. Apparatus as defined in claim 21, wherein said band extends about the girth of the enclosure opposite the frame, and wherein said bracket comprises two arms on opposite sides of the band for supporting the storage module.

23. Apparatus as defined in claim 17, wherein the support structure forms a part of a desk.

24. Apparatus as defined in claim 23, wherein the desk includes a top, and a top extension at a part of the desk away from the part carrying said storage module, said top extension being pivotally secured to said desk top to form a typing extension or the like.

25. Apparatus as defined in claim 17, wherein the support structure carries a plurality of such storage modules thereon.

26. Apparatus as defined in claim 25, wherein the plurality of storage modules are carried on opposite sides of the support structure.

27. Apparatus as defined in claim 25, wherein the plurality of storage modules are carried one over the other on the support structure.

28. A storage module comprising a frame, an enclosure supported by and enclosing the frame, and a support arm structure carried by the frame and projecting in opposite directions with respect to the frame for supporting a storage element within the enclosure.

29. A storage module as defined in claim 28, wherein the frame extends about the girth of the enclosure substantially in the mid-region of the enclosure.

30. A storage module as defined in claim 28, wherein the enclosure is formed from front and rear sections secured to the frame.

31. A storage module as defined in claim 30, including a band outside the enclosure for securing the front and rear enclosure sections to the frame.

32. A storage module as defined in claim 31, wherein the frame is notched to receive edges of the front and rear enclosure sections, and said edges include projections engaged by corresponding grooves in the band to lock the enclosure sections firmly to the frame.

33. A storage module as defined in claim 28, wherein said support arm structure comprises two pairs of support arms, one pair being positioned on one side of the enclosure and extending in opposite directions from the frame, the other pair being positioned on the other side of the enclosure and extending parallel to said one pair.

34. A storage module as defined in claim 28, wherein the enclosure is open at at least one of its ends.

35. A storage module as defined in claim 34, including a storage element movably supported by the support arm structure for movement through an open enclosure end.

References Cited

UNITED STATES PATENTS

| | | | |
|---|---|---|---|
| 2,354,106 | 7/1944 | Cooper | 312—194 |
| 3,434,768 | 3/1969 | Schreyer | 312—194 |

PATRICK D. LAWSON, Primary Examiner

U.S. Cl. X.R.

312—198, 287, 320, 326